(No Model.)
E. HOOD.
DRESS CHART.
No. 455,749. Patented July 14, 1891.
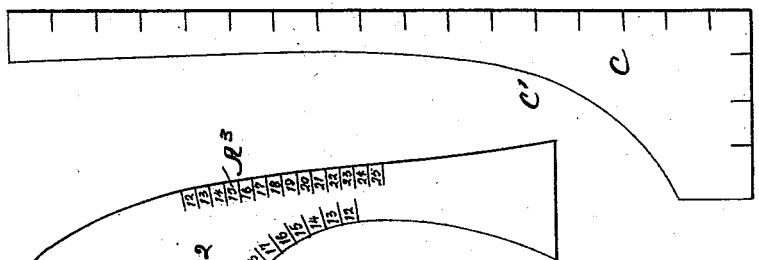
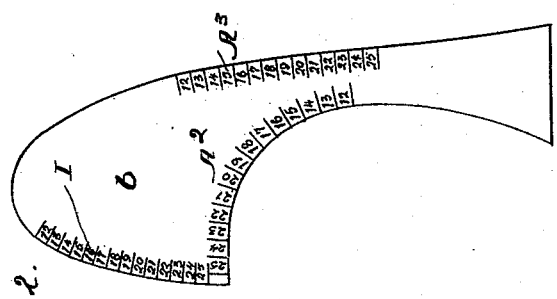
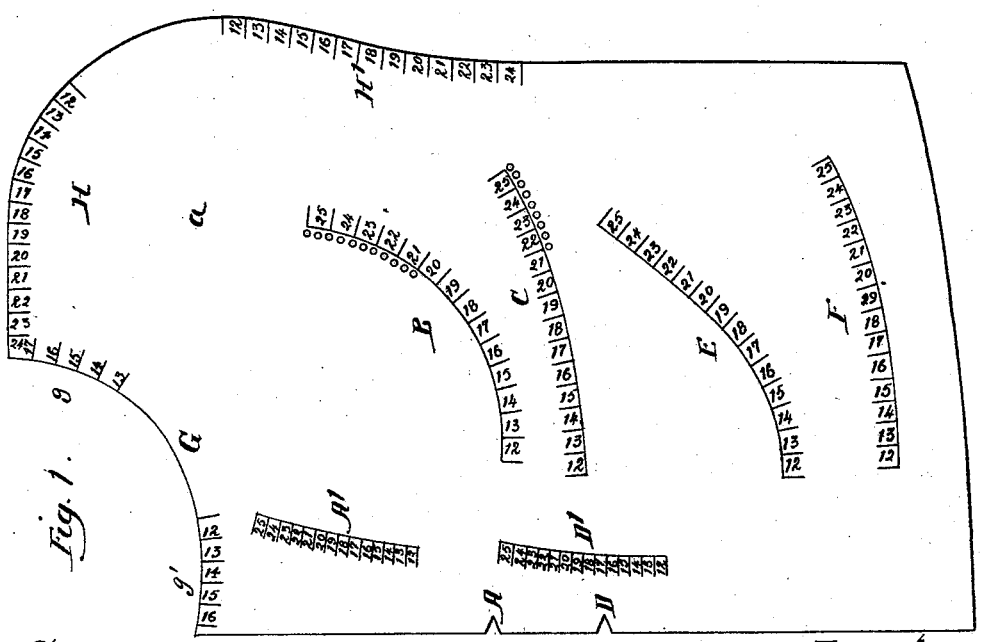
Witnesses:
Celeste P. Chapman.
Davida J. Johnson
Inventor:
Eunice Hood
By Francis W. Parker,
Attorney.

UNITED STATES PATENT OFFICE.

EUNICE HOOD, OF CHICAGO, ILLINOIS.

DRESS-CHART.

SPECIFICATION forming part of Letters Patent No. 455,749, dated July 14, 1891.

Application filed February 14, 1890. Serial No. 340,394. (No model.)

*To all whom it may concern:*

Be it known that I, EUNICE HOOD, a citizen of the United States, and a resident of Chicago, in the county of Cook and State of Illinois, have invented a new and useful Improvement in Dress-Makers' Apparatus, of which the following is a full, clear, and exact specification.

My invention relates to an apparatus for cutting garments, and has for its object to provide a convenient diagram and apparatus to be used therewith.

My invention is illustrated in the accompanying drawings, wherein—

Figure 1 is a view of the chart proper. Fig. 2 is a view of the arm-piece, and Fig. 3 of the rule.

In the drawings, $a$ represents the chart, which is formed with one straight edge J, which in use forms the base-line from which measurements are made and in which are cut the check-marks A and D. That edge of the chart which is the upper one when the chart is in the position shown in Fig. 1 is bounded by two curved lines, one of them G, which I term the "neck-curve," being concave and provided with two scales $g$ and $g'$. The other curve is convex and is divided to form a scale H. This upper curved part of the chart joins with the edge of the chart opposite the straight edge J and along it has marked a scale H'. The scales H and H' are used in laying off the sleeves.

Within the body of the chart are six scales, A', D', B, C, E, and F, the scales A', B, and C being termed the "front" scales, because used in laying off the front of the basque, and the scales D', E, and F the "back" scales, because they are used in laying off the back of the basque. The scales A' and D' are arranged near the edge J of the chart and are slightly curved away therefrom, the scale A' being above the scale D'. The scales B and C are curved, the one B much more so than the other, and are arranged near the central portion of the chart, the scale B being above the scale C. The scales E and F are arranged in the lower portion of the chart, both being curved, the one E to a greater extent than the other. The scale E is situated above the scale F. All of the centrally-arranged scales upon the chart $a$ are numbered alike, being in the drawings shown as numbered consecutively from 12 to 25, the scales A' and D' being numbered from the bottom upward and the scales B, C, E, and F from the left to the right. Adjacent to each division-mark of the inside or centrally-arranged scales of the chart is a perforation indicated by the small circles adjacent to the scales B and C. These perforations permit marks or dots to be made upon the fabric while the chart is lying thereon.

That piece of this apparatus which is termed the "arm-piece" is represented by $b$. It is of approximately parabolic shape, with one side of its expanded end cut away. Along the left-hand edge of this arm-piece, above the cut-away part thereof, is marked a scale I, which is numbered to correspond with the scales upon the chart $a$—that is, from 12 to 25—the numbering being from the top downward. About midway of the right-hand edge of this piece $b$ is marked off a scale $A^3$, numbered downward from 12 to 25. Another scale $A^2$ follows the upper portion of the bounding line, which indicates where a portion was cut away. It is numbered like the other scales from 12 to 25, beginning at the right. The scales I, $A^2$, and $A^3$ are used in laying off the arm-scyes.

The third piece of the apparatus is the rule $c$, which has a straight edge $c^2$, preferably subdivided by scratch-marks, and an edge opposite the edge $c^2$, terminating in a curve $c'$.

The invention may be best understood by a description of the way in which the apparatus is used, reference being had at the same time to the drawings.

The use and operation of my device are as follows: The goods is doubled and a base-line laid off, on which the part $a$ is placed, so that its straight line J lies upon the base-line, and a base-line dot is made at the notch A. Then make a dot on the scale A' and another on scales B and C at, for example, the figure 17, the same being one-half of the bust measurement, in this case taken at thirty-four. Place figure 17 of the scale $A^2$ on the dot made on scale A' and make a curve from that dot to the dot on the notch, the same being downwardly concave. Then place the figure 17 of the scale $A^3$ upon the dot made on scale B and with the scale $A^3$ turned toward the base-line draw a curve from the dot on the scale B through the dot on scale C around to 17 on the scale I to form the arm-scye. With the rule draw a slightly-upwardly convex curve from the dot on the scale A to the dot on the scale B for the shoulder-line. From the lowest point on the arm-scye lay off three inches with the rule and make a dot. Make another dot one and one-half inch from the lowest point of the arm-scye and another dot eight and one-half inches below the lowest point of the arm-scye for the length of the waist. These distances will vary according to the person. From the three-inch dot draw a straight line perpendicular to the base-line, and this will form a bust-line, and from the intersection of the bust and base lines draw a straight line to the one and one-half inch dot for a dart-line. On the dart-line from the base-line lay off two dots—for example, two and three-fourths inches and five and one-half inches—for the darts at the top. Now draw from the base-line and perpendicular thereto a line which will pass through the eight and one-half inch dot, and which line will extend one and one-half inch more than half the waist measurement of the person—for example, fourteen inches. On this, which is the waist-line, place your darts, laying off dots first two inches from the base-line; second, three and three-fourth inches from the base-line, the next four and three-fourth inches, and the next six and one-half inches from the base-line. We now proceed to lay off the darts. From the first dot on the dart-line to the first dot on the waist-line we draw with the rule a curve slightly convex away from the base-line. Then reverse the rule and draw a similar curve concave in the opposite direction from the first dot on the dart-line to the second dot on the waist-line. Draw a similar figure from the second dot on the dart-line to the third and fourth dots on the waist-line. Lay off on the waist-line a dot two inches from the fourth dot and a sixth dot one and one-half inch beyond that. Draw a line from the lowest point of the arm-scye to the fifth dot on the waist-line and a similar line from the same dot in the arm-scye to the sixth dot on the waist line. These lines may be straight or slightly curved, as the case may require. From the end of the arm-scye curve draw a slightly-curved line to the end of the waist-line, extending it the desired distance for the length of the basque. To complete the basque below the waist-line, place a dot upon the waist-line in the middle of each of the darts and the hip-spring, which is the figure last formed from the lowest point of the arm-scye. Draw a line from each of these dots perpendicular to the waist-line a suitable distance, according to the length of the basque. From a dot placed one-fourth of an inch on each side of the end of the two lines thus formed from the center of the darts draw two lines convex toward each other to the ends of such darts on the waist-line, and from the end of the spring-line draw a similar figure to dots 5 and 6 on the waist-line. From the extended extremity of the line drawn through the end of the arm-scye curve and the waist-line draw a line through the lower extremities of the spring and darts to the base-line and make a line from the bust-line to the waist-line one-half inch from the base-line and thence to the intersection of the lower edge of the basque and the base-line. This finishes the front of the basque.

To make the back, place the straight edge of the part $a$ on a base-line laid off on another piece of goods, and dot 17 on scales D', E, and F. From the dot on scale D' lay off a line perpendicular to the base-line and connect the dot on scale D' with the dot on scale E by a slightly-upwardly-curved line, and in like manner connect the dots on scales E and F. We now place a dot ten inches below the dot on scale F and the same distance from the base-line as the dot F. This ten inches is found to be the proper length in the case of a basque of the dimensions hereinbefore assumed. On a line perpendicular to the base-line and passing through this last-mentioned dot lay off the waist-line, and on it place one dot two inches from the base-line, another three inches, and another five inches from the base-line, and draw a slightly-curved line from the dot on scale F to the five-inch dot on the waist-line. One and three-fourth inch from the dot made on scale E lay off another dot on the down curve and place the rule so that it will engage this last-mentioned dot at about the center of its abrupt curve and draw a curve from such dot to the two-inch dot on the waist-line, and then draw a line to intersect this last line somewhat below the dot made on scale F to the three-inch dot on the waist-line. Place a dot on the base-line five inches below the waist-line, and perpendicular from such dot on the base-line lay off two dots, the first two and one-half inches from the dot on the base-line, the second six inches from the dot on the base-line. Make a straight line from this last dot to the end of the waist-line. Now from the two-inch dot and also from the three-inch dot on the waist-line draw two curved lines slightly convex toward each other to intersect the dot made two and one-half inches from the extremity of the base-line, and then draw a curve to limit the length of the basque, as the case may require. Draw a shoulder-line from the dot made on scale F perpendicular to the base-line, and from the intersection of the two draw a line to cut the waist-line one-half inch from the base-line, and from this last intersection another line to the lower end of the base-line. This finishes the back of the basque.

To draft the sleeve, lay off a base-line and two lines perpendicular thereto, one three inches from the top of the goods and the next six inches. Place the figure 17 on the sleeve-scale H at the intersection of the base-line and upper perpendicular line and with the curve upward place the figure 17 of the scale H' upon the lower line and draw a curve connecting the two. Two and one-half inches from the intersection of this curve and the upper line measured toward the base-line make a dot. Place figure 17 on scale A² against the curve and the lower line and with the curve upwardly concave draw a curve from the dot on the upper line for the under part of the sleeve. Measure the distance from the shoulder to the elbow—say twelve inches—and lay this off on the base-line from the intersection of the base-line with the upper line. From this dot lay off the length of the sleeve from the elbow to the wrist—say eight inches. Four inches from this last dot and on a line perpendicular to the base-line lay off another dot and connect this last dot with the elbow-dot. Lay the rule so as to be perpendicular to the upper line and lay off a dot one and one-half inch less than the distance from that upper dot to the elbow-dot and connect this dot with the elbow-dot, and on the line connecting these two lay off a line—for example, six inches, according to the size of the elbow—and dot off one inch away from the base-line. At the extremity of the lower end of the sleeve lay off four and one-half inches for the hand and dot one inch from the end of the sleeve. This latter line will be at a slightly greater angle to the base-line than is the elbow-line. You now connect the end of the sleeve-line with the end of the elbow-line and the elbow-line with the intersection of the lower line and the upper curve by two curves slightly concave away from the base-line. Strike a line from the dot which is two and one-half inches from the intersection of the upper curve with the upper line to the dot on the elbow-line, which is one inch from the base-line, and then connect the two dots on the elbow-line and the end of the wrist-line, which are one inch, respectively, from the base-line, and draw a line from the intersection of the elbow-line and base-line to the end of the wrist-line. This finishes the sleeve. It is evident, of course, that the use of the chart will vary greatly, according to circumstances, and I have only hereinbefore given a brief description of its application for cutting a garment of a certain size and shape.

Having thus described my invention, what I claim, and desire to secure by Letters Patent, is as follows:

In a dress-maker's apparatus, the combination of a piece a, having the curves and scales G, H', and H and the scales A', B, and C and D', E, and F, with the piece b, having the curves and scales A², A³, and I, and a rule having the curve C' and scale C², all substantially as and for the purpose described.

Dated Chicago, February 11, 1890.

EUNICE HOOD.

Witnesses:
CELESTE P. CHAPMAN,
DAVIDA J. JOHNSON.